March 9, 1926. 1,575,836
C. E. HUTCHINGS
ADJUSTABLE LENS BOARD FOR CAMERAS
Filed April 14, 1924
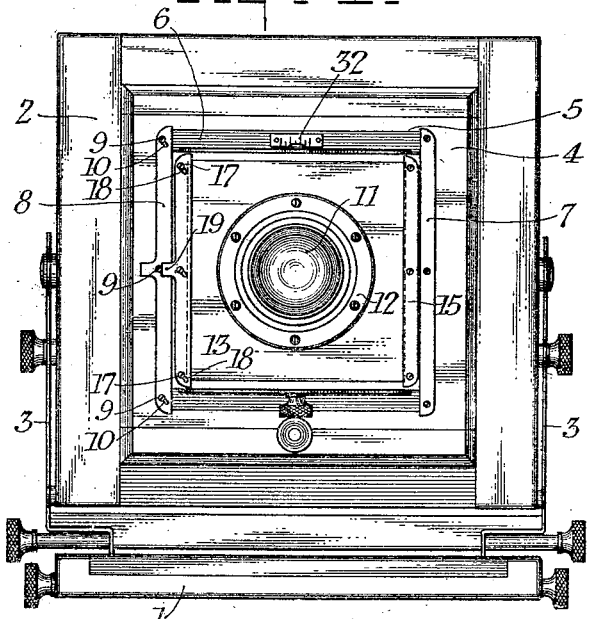
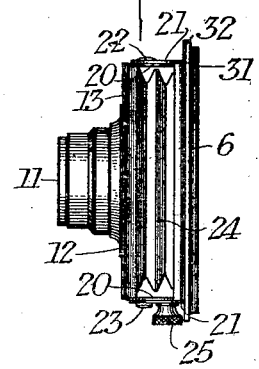
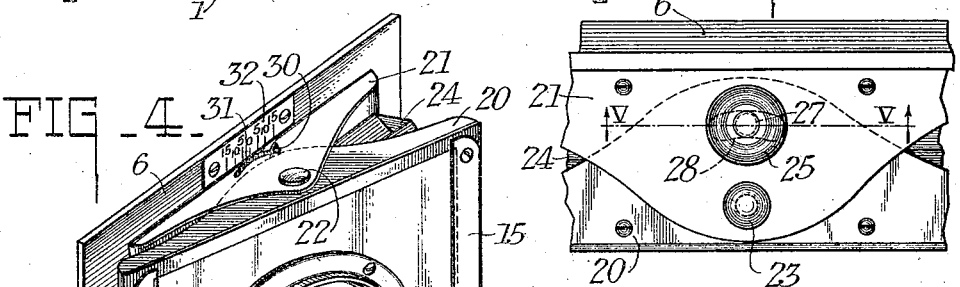
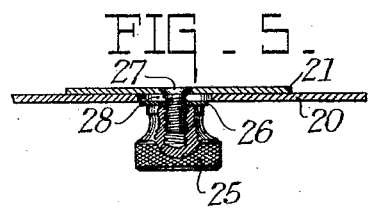
INVENTOR,
Charles E. Hutchings,
BY R L Stinchfield
ATTORNEYS.

Patented Mar. 9, 1926.

1,575,836

UNITED STATES PATENT OFFICE.

CHARLES E. HUTCHINGS, OF ROCHESTER, NEW YORK, ASSIGNOR TO EASTMAN KODAK COMPANY, OF ROCHESTER, NEW YORK, A CORPORATION OF NEW YORK.

ADJUSTABLE LENS BOARD FOR CAMERAS.

Application filed April 14, 1924. Serial No. 706,581.

*To all whom it may concern:*

Be it known that I, CHARLES E. HUTCHINGS, a citizen of the United States of America, residing at Rochester, in the county of Monroe and State of New York, have invented certain new and useful Improvements in Adjustable Lens Boards for Cameras, of which the following is a full, clear, and exact specification.

This invention relates to photography and more particularly to photographic camera construction. One object of my invention is to provide a lens board upon which the objective may be adjusted angularly; another object is to provide a swinging mount for objectives which can be easily attached to or removed from cameras of the standard types; another object is to provide an adjustable lens board which can be easily locked in any desired position; still another object is to provide an indicator adapted to show the amount of angular swing to which the lens board may be adjusted, and other objects will appear from the following specification, the novel features being pointed out in the claims at the end thereof.

In the drawings wherein like reference characters indicate like parts throughout:

Fig. 1 is a front elevation of a camera carrying an adjustable lens board constructed in accordance with and illustrating one embodiment of my invention;

Fig. 2 is a side elevation of the adjustable lens board removed from the camera;

Fig. 3 is an enlarged fragmentary bottom plan view of the fastening means for adjusting the angular relation of the hinged members;

Fig. 4 is an enlarged perspective view of my adjustable lens board with the front lens board moved at an angle to the rear frame; and Fig. 5 is a fragmentary detail section on line 5—5 of Fig. 3.

While I have shown in the drawings a camera of the "view" type it is to be understood that this is shown merely by way of illustration, as this type of adjustable lens carrier is suitable for a variety of different types of cameras.

In Fig. 1 the camera consists of a base 1 which carries a camera front 2 in the yoke 3. This camera front includes the usual slidable member 4 which is apertured at 5 to receive a frame 6. This part is held on one side beneath the metal strip 7 and on the other side is retained by a sliding bar 8 which may be moved upon the studs 9 which pass through angularly disposed slots 10. So far the construction described is of the usual type for such cameras.

The objective 11 is carried upon a lens board 13 by means of the flange 12. This lens board fits into a frame 14 being held on one side by the metal strip 15 and on the other side by a slidable metal strip 16. Strip 16 slides upon the screws 17 which pass through the angularly disposed slots 18. A handle 19 is provided for convenience in operating this member. Frame 14 is spaced from frame 6 by means of a pair of flanges 20 carried by part 14 and 21 carried by the frame 6. These flanges are hinged together at the top by a stud 22 and at the bottom by a second stud 23. This construction permits the frames to be angularly adjusted with respect to each other. A bellows 24 forms a light tight flexible wall between these two frames.

In order to fasten these frames in the desired position I provide a thumb screw 25 which bears against a washer 26 lying upon flange 20. Flange 21 carries a screw 27 which passes through an arcuate slot 28 in plate 20 and upon which the thumb nut 25 screws. When the nut is tightened the flanges 20 and 21 are frictionally held in contact.

On one flange 20 there is a turned-up lug 30 which passes through an arcuate slot 31 in flange 21. This pointer moves across a scale 32 upon which it indicates the angular relation of the two frames. As the frame 6 is preferably square this adjustable lens carrier can be placed in the aperture 5 of the camera front 4 in position to use the angular adjustment in a vertical or horizontal direction so that this device may be used to increase the effect of a tilting or swinging front for cameras.

Having thus described my invention, what I claim as new and desire to secure by Letters Patent is:

1. An adjustable lens board for cameras including a pair of spaced frames, each frame having side flanges extending toward each other and pivoted together at their center portions, and a flexible wall extending between the two frames.

2. An adjustable lens board for cameras including a pair of spaced frames, each frame having flanges pivoted together, one flange carrying a screw and the other flange a slot through which the screw passes whereby the spaced frames may be adjusted angularly and locked in the desired position.

3. An adjustable lens board for cameras including a pair of spaced frames, flanges extending between the frames, hinge connections between the flanges, a flexible light proof connection between the frames, one flange carrying a fastening device adapted to hold the frames in fixed relation by binding the two flanges together.

4. An adjustable lens board for cameras including a frame, an objective carrying member movably mounted thereon, and a scale and pointer, one mounted on the objective holder and the other mounted on the frame, whereby the angular adjustment of the parts is indicated on the scale.

5. An adjustable lens board for cameras including a pair of spaced frames, each frame having a flange pivoted to the other frame, the flange of one frame being slotted, and a pointer on the other adapted to project through the slot, whereby the relative angular adjustments of the frames is indicated by the pointer.

6. An adjustable lens board for cameras including a pair of spaced frames, each frame carrying flanges two flanges being slotted, pivots extending through the flanges, a bellows connecting the frames and forming light tight connections therewith, members carried by the two flanges adapted to cooperate with the slotted flanges, one to form a pointer to indicate the relative angular relation of the frames, and the other to cooperate with a locking mechanism by which the frames may be held in the desired position.

Signed at Rochester, New York, this 9th day of April 1924.

CHARLES E. HUTCHINGS.